J. McCARROLL.
SELF ACTING ELEVATOR SAFETY APPARATUS.
No. 10,127. Reissued May 30, 1882.
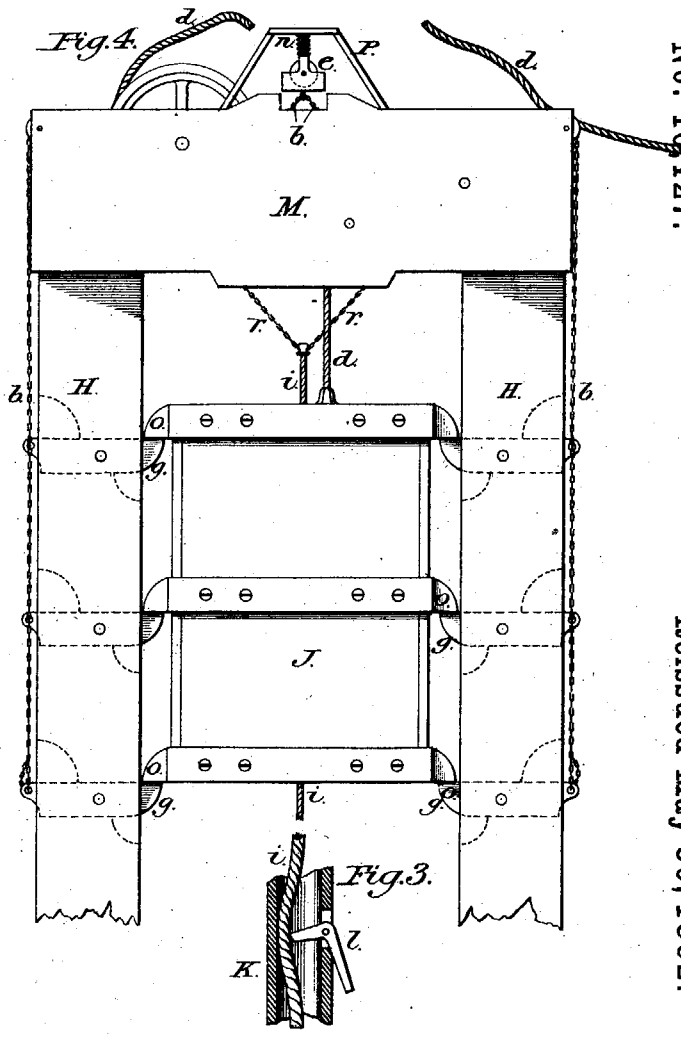
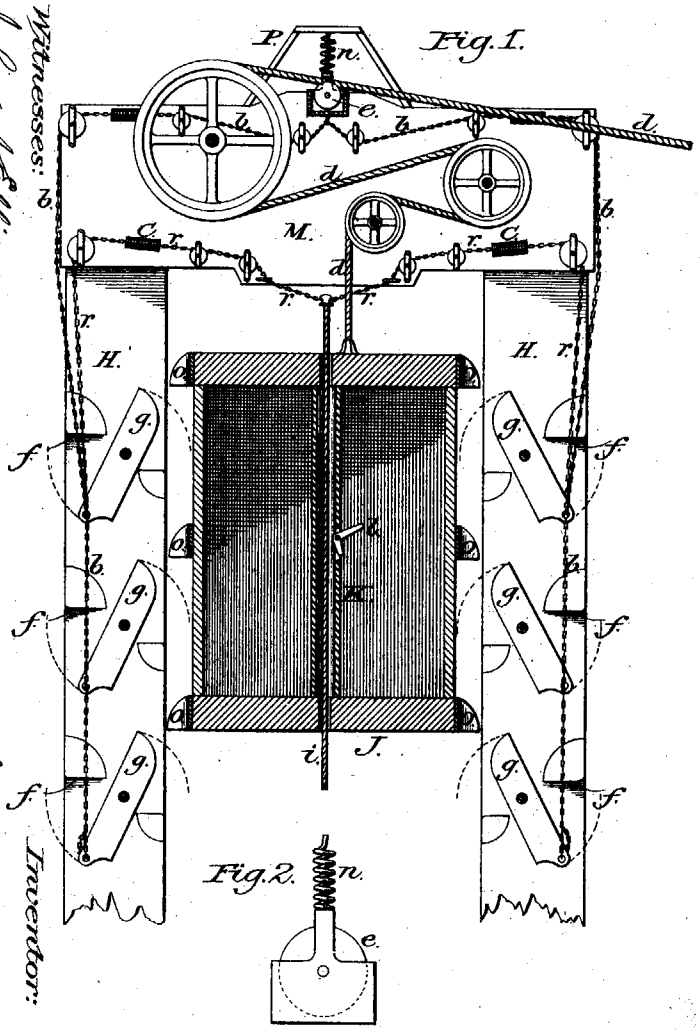
Witnesses:
John A. Ellis.
P. Elbert Nostrand
Inventor:
James McCarroll
N. PETERS, Photo-Lithographer, Washington, D. C.

UNITED STATES PATENT OFFICE.

JAMES McCARROLL, OF NEW YORK, N. Y.

SELF-ACTING ELEVATOR SAFETY APPARATUS.

SPECIFICATION forming part of Reissued Letters Patent No. 10,127, dated May 30, 1882.

Original No. 255,646, dated March 28, 1882. Application for reissue filed April 29, 1882.

*To all whom it may concern:*

Be it known that I, JAMES McCARROLL, a citizen of the United States, residing in the city, county, and State of New York, have invented a new method, apparatus, or machine for preventing elevators from falling in case of an accident to the rope, chain, or other contrivance by which the platform or carriage is suspended, of which the following is a specification, the means by which I attain this object being illustrated in the accompanying drawings.

Figure 1 is a vertical section of the whole apparatus; Fig. 2, a detached view of the movable pulley and spring actuating the safety-catches; and Fig. 3 represents a cam adapted to bear and secure a cord led through a hollow tube in the elevator; Fig. 4, an elevation showing the suspension-rope broken.

The cage or carriage of my improved elevator is constructed of any approved pattern, and is adapted to be suspended by one or more hoisting ropes or chains passing over a pulley or series of pulleys supported upon suitable cross-beams overhead, and to be guided in its travel up and down between upright ways, all as is found in the best form of elevators now in use.

My invention relates to devices for automatically arresting the fall of the elevator at any point in its descent in case the hoisting rope or chain from which it is suspended shall give way or break, as is hereinafter fully described.

In the accompanying drawings, H H are upright posts or columns, between which the elevator J moves, and M the cross-beam, from which the elevator is suspended by means of one or more wire ropes, *d d*. The main suspension-rope *d* is led over suitable pulleys to a winding-drum operated by a steam-engine or other suitable motor. In its course to this drum it is carried over the top of a friction-pulley, *e*, revolving in a box which has free play vertically in the pedestal or hangers P, by which it is supported. The box carrying the pulley *e* is supported by a spring, *n*, of any approved pattern, and the suspension-rope *d* is so brought to bear upon the pulley as that the tension thereon, when carrying the weight of the elevator, will operate to bear upon the spring and extend it into position to contract powerfully the instant the tension of the rope *d* is slackened or removed by a severance thereof or other cause. Upon the sides of the elevator J are firmly secured a series of projecting lugs or pins, O O, either singly or upon a connecting-plate in the form of a rack. Opposite to these lugs O O a series of latches, *g g*, are centrally pivoted upon the uprights H, between which the elevator moves, so as that the outer arms of the latches are brought to bear against stops upon the sides of the uprights H, which arrest their further movement and afford them very firm support. The inner arm of each latch is somewhat heavier than its outer arm, so that the latch will turn automatically upon its pivot, carrying its outer arm inward clear of the rack or lugs O O upon the elevator. The inner arms of all the latches are connected by a chain or cord, *b*, with the lower end of the sliding box carrying the friction-pulley *e*, this chain or cord being so adjusted as that when the box and pulley are forced down by the tension of the suspension-rope *d* thereon the inner arms of the latches will be drawn down thereby, so as to disengage and clear their outer arms from the lugs or rack O O on the elevator. Auxiliary cords or chains *r r*, connected with the cord *b*, and by means thereof with all the latches *g g*, or otherwise connected directly with the inner arms of said latches, are led to a wire cord which passes down through a vertical tube or hollow post, K, in the elevator. A cam, *l*, hinged in a slot in the side of the tube or post K, and having an arm projecting outward therefrom, is by a downward movement of said arm brought to bear upon the wire cord so as to clamp it. Hence when the elevator is falling a slight pressure upon the arm of the cam *l* will cause it to catch and hold the rope, and thereby exert a tension upon the latches *g g* to bring them into play to engage and arrest the elevator and prevent its fall, as above described.

Springs C C may be interposed in the cords *r r* to prevent an undue strain upon and consequent snapping of said cords should the latches *g g*, when called upon to act, drop directly against the lugs O O instead of between them.

In the operation of the elevator the latches *g g* are maintained in their inoperative position by the weight of their inner arms, the cords *b*

*b* being kept slack and the spring *n* extended by the constant pressure of the elevator-rope *d* upon the friction-pulley *e*, due to the tension of the rope by reason of the weight of the elevator thereon. In case, however, of a sudden breakage of the rope *d*, the spring *n*, relieved from tension, will fly up, carrying with it the cords *b b*, and thereby exert such strain thereon as shall cause them to instantly throw out the latches, so that they shall engage the lugs O O, (see Fig. 4,) and thereby arrest and uphold the elevator and prevent its fall. The same effect may be produced instantly by a pull upon the arm of the cam-lever *l* within the elevator should it be falling, for the weight of the cage in descending will, by the engagement of the cam with the cord *i*, (see Fig. 4,) instantly operate upon the latches to bring them into play, as above described. Thus I have in this apparatus two sure and certain modes presented for preventing a calamity in the event of an accident to the sustaining-rope—the one self-acting through the instant operation of a spring, *n*, the other at the disposal of any one who, being in the elevator, may give a pull upon the cam-lever *l*.

It is evident that the character and position of the safety-spring *n*, actuating the latch-cords *b b*, and of the method of bringing the tension of the main rope *d* to bear thereon, may be greatly varied without departing from my invention, and that many equivalent devices may be substituted for the cam *l* to obtain a grip of the safety-cord *i* within the elevator.

What I claim as new, and desire to secure by Letters Patent, is—

1. The combination of latches pivoted upon the sides of an elevator shaft or frame, and adapted to engage projections or recesses in the elevator, with a spring brought into play by the tension thereon of the main rope, under the weight of the elevator suspended therefrom, and with intermediate cords, by which the spring, when relieved from tension, will be made to act upon the latches and throw them into effective engagement with the elevator to arrest and support it, substantially in the manner and for the purpose herein set forth.

2. The cam, hollow tube, and auxiliary chains in their connection with the latches, substantially in the manner and for the purpose herein set forth.

JAMES McCARROLL.

Witnesses:
FULLER WALKER,
W. H. SHUEY.